July 9, 1929.   J. B. KIRBY   1,719,983
LUBRICATING DEVICE
Filed Jan. 4, 1927
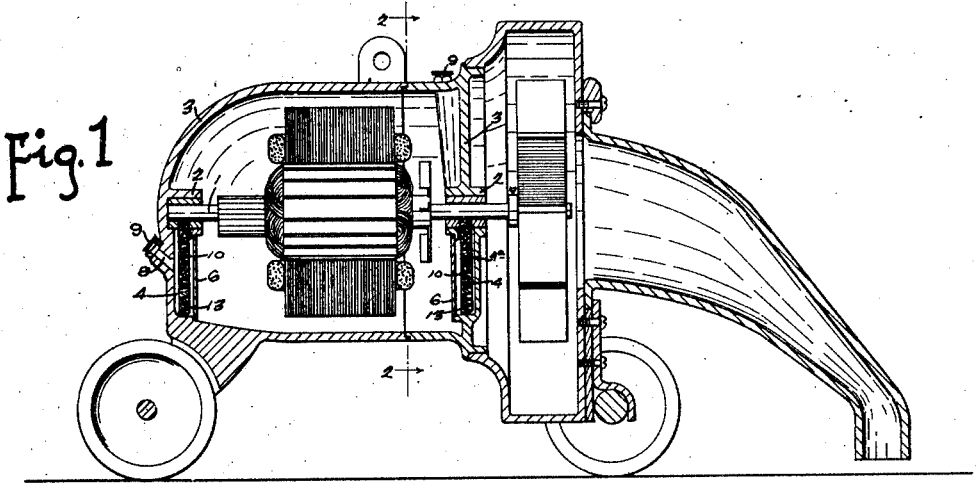
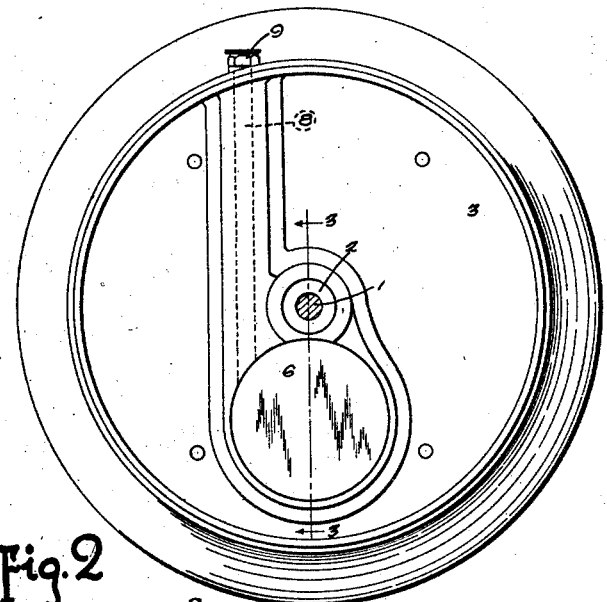
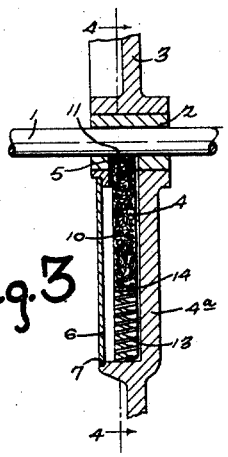
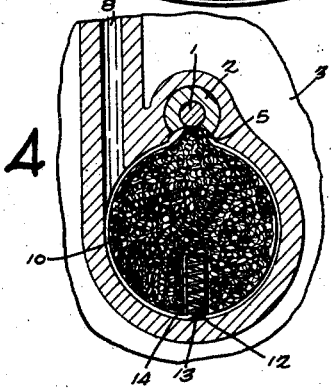
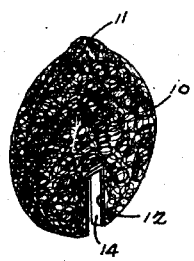
James B. Kirby
Inventor
by Smith and Freeman
Attorneys Patented July 9, 1929.

1,719,983

UNITED STATES PATENT OFFICE.

JAMES B. KIRBY, OF WEST RICHFIELD, OHIO.

LUBRICATING DEVICE.

Application filed January 4, 1927. Serial No. 158,997.

This invention relates to lubricating devices and more particularly to such devices as are employed for the purpose of applying lubricant gradually and economically to the bearings of shafts over long periods of time. The objects of the invention are the provision of a device of this character which can be simply and cheaply produced, can be conveniently replenished, shall be proof against leakage, and shall possess such oil capacity as will adequately lubricate the mechanism for very long periods in spite of neglect. Such devices are, for example, peculiarly important in connection with domestic labor saving appliances which receive hard usage and a minimum of skilled attention. As a specimen embodiment of my invention I have chosen for illustrative purposes a portable type suction cleaner, owing to the fact that it combines in itself the severest of all requirements, namely a high speed shaft, exhibiting 10,000 to 15,000 revolutions per minute, a dust laden environment, a device which of all things must not leak oil upon the rugs or floor, a device which, being largely operated by servants, seldom receives careful attention, and one which because of its speed can be operated only a few hours without lubrication. The devices herein illustrated have on test exhibited successful performance without attention or replenishment for more than 3,000 hours; but it will be understood that I do not limit myself to the use of my improvements in connection with suction cleaners.

In the drawings accompanying and forming a part of this application Fig. 1 is a longitudinal central sectional view through a suction cleaner equipped with my improved lubricating devices; Fig. 2 is a vertical sectional view corresponding to the line 2—2 in Fig. 1; Fig. 3 is a detail sectional view corresponding to the line 3—3 in Fig. 2; Fig. 4 is a sectional view corresponding to the line 4—4 in Fig. 3 and Fig. 5 is a perspective view of the absorbent pad.

Describing the parts by reference characters, 1 represents a rotatable shaft, here the armature shaft of a motor comprising a part of a suction cleaner, said shaft being journaled in cylindrical bearings 2—2 carried in the upright walls 3—3 of the supporting body which here constitutes the casing of such cleaner. Beneath the bushing or journal box the wall of the casing is formed with a wide shallow recess 4, and the bottom wall of the journal box has an aperture 5 milled therein from the recess establishing communication with said recess. One wall of this recess is preferably integral with the wall 3 of the supporting body as at $4^a$, while the opposite wall is preferably formed by a sheet metal plate 6 pressed powerfully into place in a circular rabbet 7 formed to receive the same. To this recess a suitable oil duct 8 leads from the exterior of the machine where it is provided with a suitable displaceable cap 9.

Located inside the recess 4 is a flat pad 10 of fibrous absorbent material, preferably felt or some felt-like substance, and having an external shape conforming generally to that of the recess but of slightly smaller size. Preferably the recess is approximately circular as shown in Fig. 4, and the pad is also circular excepting for an integral tongue 11 at the upper margin which tongue projects through the aperture 5 and into engagement with the shaft 1. Opposite this tongue the pad is formed with a notch 12 in which is a helical spring 13 which presses the pad and with it the tongue 11 continuously towards the shaft. Preferably this notch is cased with a U-shaped sheet metal lining 14 so that the action of the spring may not be impeded by any swelling of the absorbent material or other entanglement.

Owing to the location of the recess beneath the bearing there is no likelihood of oil leakage, since the walls of the recess are permanently sealed. The cover plate 6 when once applied is immovable. The capacity of the recess is such as to hold sufficient lubricant for months of operation. Another advantage of this construction is that it provides a comparatively large oil-storage area combined with a large available cross-section of the absorbent material without substantially increasing the length of the shaft.

While I have illustrated my improvements in connection with a specific apparatus, I do not limit the same with any type of mechanism, nor do I limit myself to the particular details of construction or arrangement herein illustrated, except as the same are specifically cited in my several claims or rendered necessary by the prior art.

Having thus described my invention, what I claim is:—

1. In a device of the character described, the combination of a journal box having an aperture in one of its walls and a flat-walled recess located wholly at one side of said journal box and communicating with said aperture, a flat disk of absorbent material located in said recess and having an outwardly extending tongue projecting through said aperture, said disk having a notch opposite said tongue, and a spring in said notch bearing against a wall of said recess and forcing said tongue into said aperture, said recess also having a filling opening.

2. In a device of the character described, the combination with a supporting body having a journal box, said body having a flat-sided, lozenge-shaped recess adjacent to said box at one side thereof and the wall of said journal box having an aperture therein communicating with said recess, a flat felt disk located in said recess and having at one side an outwardly extending tongue projecting through said aperture and at the other side a notch in line with said tongue, a spring in said notch forcing said tongue through said aperture, and a closure for the side of said recess.

3. A supporting body including a generally upright wall having a journal box therein, and a shallow recess wholly below said journal box, said journal box having an aperture in its bottom wall which communicates with said recess, a flat pad of fibrous absorbent material movably mounted in said recess and having an outwardly extending tongue projecting upwardly through said aperture, said pad also having a notch in the edge opposite said tongue and in line therewith, a spring in said notch, and a sheet metal cover hermetically seated in the mouth of said recess, the wall of said body having an oil duct leading into said recess from above.

4. The combination with a substantially horizontal bearing of a support therefor having at a point below and adjacent to said bearing a laterally opening recess, the wall of said bearing having an aperture communicating with said recess, a sheet metal closure hermetically seated in the mouth of said recess, a pad of fibrous absorbent material loosely located in said recess and having an outwardly extending tongue projecting up through said aperture, and a spring forcing said pad tongue toward said bearing, said support having an oil duct leading to said recess.

5. The combination with a support and a journal bearing therein for a shaft, said support having a flat, wide and shallow circular recess opening through one wall wholly at one side of said bearing, the axis of such recess being parallel to the shaft axis, of a flat disk of absorbent material loosely located in said recess, said bearing having a rectangular aperture in its wall communicating with said recess and said disk having a tongue projecting through said aperture, the mouth of said recess having a circumferential rabbet and a flat circular cover plate tightly seated in said rabbet.

In testimony whereof I hereunto affix my signature.

JAMES B. KIRBY.